United States Patent

[11] 3,584,210

[72] Inventor Anthony John Shawcross Udall
Ashford, Middlesex, England
[21] Appl. No. 782,244
[22] Filed Dec. 9, 1968
[45] Patented June 8, 1971
[73] Assignee Electric & Musical Industries Limited
Hayes, Middlesex, England
[32] Priority Dec. 7, 1967
[33] Great Britain
[31] 55701/67

[54] ELECTRICAL FUNCTION GENERATORS USING BREAK-POINT UNI-DIRECTIONALLY CONDUCTIVE DEVICES
6 Claims, 2 Drawing Figs.

[52] U.S. Cl. .......... 235/197, 307/229
[51] Int. Cl. .......... G06g 7/28
[50] Field of Search .......... 235/197, 194, 184, 150.53; 328/142, 144; 307/229, 330

[56] References Cited

UNITED STATES PATENTS 3,110,802 11/1963 Ingham et al. .......... 235/197X
3,191,017 6/1965 Miura et al. .......... 235/197X
3,253,135 5/1966 Collings et al. .......... 235/197X
3,296,428 1/1967 Nathan .......... 235/197
3,413,456 11/1968 Sutton .......... 235/197X
3,443,082 5/1969 Abe .......... 235/197

*Primary Examiner*—Malcolm A. Morrison
*Assistant Examiner*—Joseph F. Ruggiero
*Attorney*—William W. Downing, Jr.

ABSTRACT: An electrical function generator of the type which employs breakpoint unidirectionally conductive devices includes a signal source and a source of bias potential, each coupled via linear impedance means to a connecting point. The connecting point is coupled to a load via a first unidirectionally conductive device and the connecting point is also coupled directly to a reference potential via a second unidirectionally conductive device connected reversely to the first device. By this means, the effect of capacitance associated with the first device, when nonconductive, is reduced and the input impedance presented to the signal source is substantially constant.

Inventor A J S Udall

By

Atty

Figure 1:
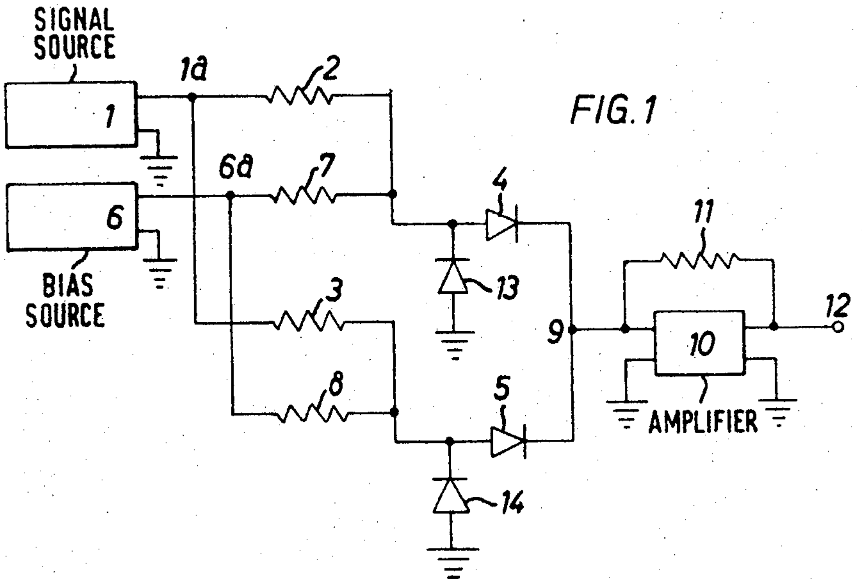

ELECTRICAL FUNCTION GENERATORS USING BREAK-POINT UNI-DIRECTIONALLY CONDUCTIVE DEVICES

This invention relates to electrical analogue function generators.

In one type of electrical analogue function generator known as the breakpoint function generator, unidirectionally conductive devices, such as for example diodes, are connected between a plurality of different impedance networks and a load, so that with variation of an input signal or signals the diodes become selectively conducting and nonconducting and an output signal is set up across the load related to the input signal, or signals, according to a function successive sections of which are determined by the respective networks. In such function generators the impedance of the load is usually very small so that as the diodes become conducting or nonconducting the impedance presented to the signal source changes substantially and it is desirable for the signal source to have a low impedance to maintain the accuracy of the circuit. However in analogue computers and other analogue circuits it may be desirable to set up the signal by means of a potentiometer and the impedance of this, being high, may have to be transformed by an amplifier or other means. The accuracy of the transformation must however be of the same order as the accuracy required of the function generator and therefore the need of impedance transformation can add substantially to the cost of the function generator.

An object of the present invention is to provide an improved function generator in which the above difficulty is reduced.

A further object of the invention is to provide an improved function generator, in which the reverse voltages applied to the unidirectionally conductive devices are substantially reduced.

A still further object is to provide an improved function generator in which the effect of stray capacitance associated with the unidirectionally conductive devices, when nonconductive, is reduced or eliminated thereby to improve the high speed response of the generator.

According to the invention there is provided an electrical function generator comprising a signal source, a source of bias potential and a generating circuit, the circuit comprising:

a. a first two electrode unidirectionally conductive device,
b. a second two electrode unidirectionally conductive device,
c. linear impedance means connected from said signal source to a connecting point formed between dissimilar electrodes of said devices,
d. linear impedance means connected from said source of bias potential to said connecting point,
e. the free electrode of said first device being coupled to an output terminal of said circuit and
f. the free electrode of said second device being connected to a reference potential in such a way that the said two devices are rendered conductive and nonconductive in substantially complementary fashion and the effect of stray capacitance associated with said first device in its nonconductive state is reduced by the presence of said second device. In a practical form of the invention the source means may comprise a signal source and a resistance or other impedance element and the nonlinear device may comprise a unidirectionally conductive device which is biassed so that it changes from a high impedance to a low impedance with variation of the signal from said source. Moreover the load may be constituted by the input impedance of an amplifier which is provided with negative feedback in such a way that its input impedance is very small compared with the impedance of said device when nonconducting.

Figure 2:
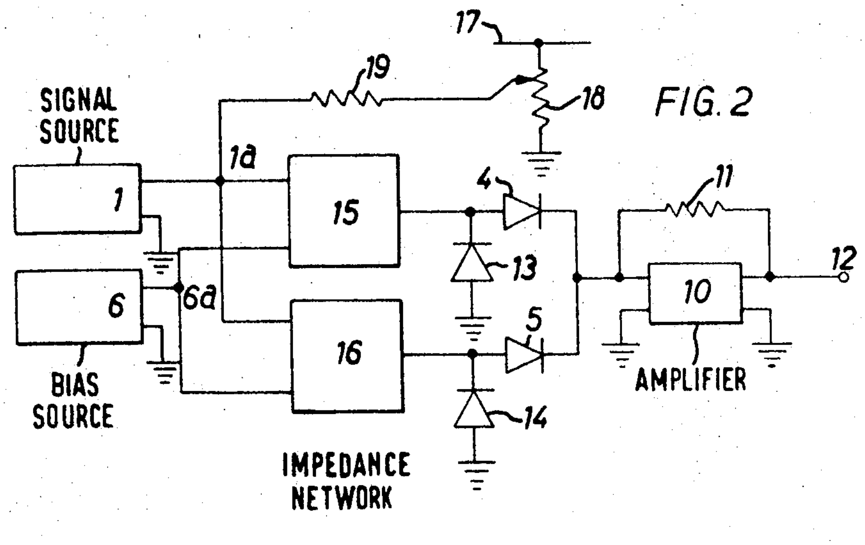

In order that the present invention may be clearly understood and readily carried into effect it will now be described with reference to the accompanying drawings in which:

FIG. 1 represents in diagrammatic and simplified form one example of an electrical analogue function generator according to the invention; and FIG. 2 represents another example of a function generator according to the invention.

In FIG. 1, the rectangle 1 represents a source of a variable electrical signal which is set up between the terminal 1*a* and ground. The source 1 may be a potentiometer or other means providing a variable voltage. The terminal 1*a* is connected by impedances 2 and 3 which are resistors in this form of the invention to the anodes of diodes 4 and 5 respectively. The rectangle 6 represents a source of present bias voltage which is set up between the terminals 6*a* and ground. The voltage at the terminal 6*a* is applied by impedances 7 and 8 to the anodes of the diodes 4 and 5 respectively, the impedances again being resistors in this example of the invention. The cathodes of the diodes 4 and 5 are connected together and to one input terminal 9 of a DC inverting amplifier 10. The other input terminal of this amplifier is grounded. The amplifier 10 is provided with a feedback resistor 11 connecting its output terminal 12 to its input terminal so as to provide negative feedback. There are also included in the circuit 2 further diodes 13 and 14 which are connected from the anodes of the diodes 4 and 5 respectively to ground. The diode 13 shunts the series combination of the diode 4 and the input impedance of the amplifier 10 which is the load for the circuit components 1 to 8. Similarly the diode 14 shunts the series combination of the diode 5 and the input impedance of the amplifier 10. The diodes 13 and 14 are connected in reverse sense to their respective diodes 4 and 5.

Assume initially that the resistors 2 and 7 and the resistors 3 and 8 have magnitudes selected so that the potential at the junction of 2 and 7 is higher than the potential at the junction of 3 and 8. Assume moreover that initially the voltage from the source 1 applied to the terminal 1*a* is such that the potential at both said junctions tends to be below earth potential. Considering the diodes 4 and 13, under the conditions assumed the diode 13 is conducting and the diode 4 nonconducting, and the conduction of the diode 13 increments the current flowing in the resistor 7 to cause the potential at the junction of 2 and 7 to have a value just below earth potential. The current in the resistor 2 adjusts itself to a value determined by the magnitude of the resistor 2 and the voltage of the source 1 with respect to earth potential. If subsequently the voltage of the source 1 rises so that the potential at the junctions 2 and 7 tends to rise above earth potential, the diode 13 becomes cut off and the diode 4 starts to conduct. This corresponds to passing through the breakpoint. The current passing through the diode 4 forms an input signal to the amplifier 10 and this operates as a see-saw amplifier in such a way that its input impedance is negligibly small. The input terminal of the amplifier 9 is therefore a virtual earth point and the input current to the amplifier is determined substantially only by the magnitude of the resistor 2 and by the voltage of the source 1 with respect to earth potential. Although the impedance of the diode 4 changes substantially with respect to the input impedance of the amplifier 10 as the breakpoint is passed through, the impedance of the diode 13 changes in a substantially complementary manner to that of the diode 4 and reduces the changes in impedance presented to the voltage source 1. Indeed, the transition from one side to the other of the breakpoint takes place without any substantial change in the impedance presented to the voltage source 1. The operation of the diodes 5 and 14 is similar but under the conditions assumed the breakpoint for this pair of diodes occurs at a higher signal voltage than that for the diodes 4 and 13. When the diode 5 becomes conducting, the input signal to the amplifier 10 becomes a function of the voltage of the source 1 and the magnitudes of the resistors 2 and 3 in parallel. In the general case, a circuit such as that represented in FIG. 1 may have a greater number of diodes such as 4 and 5 and corresponding resistor networks such as 2, 7 and 3, 8. As the breakpoints of the different diodes are successively attained, there is generated at the output terminal of the amplifier a signal which is related to the voltage of the source 1 in accordance with a function successive sections of which are determined by the selected magnitudes of the resistors 2, 3... and other circuit parameters. In the case of FIG. 1, the function is built up of a number of linear sections approximating to a desired nonlinear function. The function may for example be the square of the input variable. When a diode such as 4, 5 becomes conducting it remains conducting until the voltage from the source 1 falls again to that value which corresponds to the breakpoint for the respective diode.

The example of the invention described and illustrated with respect to FIG. 1 is a relatively simple one, and the networks between the signal source and the diodes may be more complicated than the simple resistor networks which are shown. The generator may also be arranged to respond to more than one variable signal. A generator such as illustrated may be incorporated in a so-called "quarter squares" multiplying circuit.

All the networks need not necessarily respond to the same input variable or combination of input variables, so that relatively complex functions of several variables can be produced by the generator. In a further modification of the invention the feedback resistor 11 may be replaced by separate feedback resistors from the output of the amplifier 10 to the anodes of the diodes 4 and 5.

The invention is indeed generally applicable to analogue function generators of the kind in which at least one variable signal is applied via a nonlinear device to a load and the impedance of the device is liable to change substantially with respect to the impedance of the load so that the signal source would normally tend to be presented with a widely varying impedance.

In FIG. 2 components which correspond to those in FIG. 1 carry the same reference numerals as in FIG. 1. In FIG. 2, the networks connecting the sources 1 and 6 to the diodes are represented as blocks 15 and 16 to indicate they may be other than simple resistor networks. A resistor 19 is connected from the wiper of a potentiometer 18 connected between a conductor 17 and earth. The conductor 17 is maintained at a constant potential of opposite sign to the potential of the bias source 6.

The arrangement of FIG. 2 is intended to overcome a difficulty which may not be significant when the simple networks of FIG. 1 are used, but may be so when the networks 15 and 16 are such that substantial current can flow from the bias voltage source 6 through the networks to the terminal 1*a* and thence into the signal source 1. Under these circumstances any substantial variation in the impedance of the signal source, such as could arise if the signal voltage is set up on a potentiometer, would produce a variable error in the output voltage. However, by adjustment of the wiper of potentiometer 18, a current may be applied to the terminal 1*a* to nullify the current flowing to the terminal 1*a* through the networks 15 and 16, so that there is no resultant current from the bias voltage flowing in the signal source impedance. After the networks 15 and 16 have been set up to generate the desired function of the signal, the potentiometer 18 is adjusted so that zero voltage appears at terminal 1 due to the bias voltage. More than one arrangement such as 17, 18, 19 may be provided if the generator is arranged to generate a function of more than one variable. In some cases, the generator may include bias sources such as 6 providing bias potentials of opposite polarities, with appropriate modifications in other parts of the circuit. In that case, the potentials applied to the compensating potentiometers 18 may be derived from the bias source providing the potentials of the required polarity.

As explained above, the invention has the advantage of enabling a high impedance source, such as a potentiometer, to be used as the source 1, without the need to interpose an impedance transforming amplifier or other means to maintain the required accuracy of the circuit. The invention may however be used to obtain one or more additional or alternative advantages. One such advantage is that the capacities associated with diodes such as 4 and 5 when nonconducting are effectively short circuited by diodes such as 13 and 14, so that the high frequency response of the generator is improved. In addition, the shunt diodes 13 and 14 serve to reduce significantly the reverse voltages applied to the diodes 4 and 5 when nonconducting, so that diodes with a relatively low reverse-to-forward resistance ratio and relatively low break down voltage can be employed without the same reduction in performance as would otherwise be engendered.

I claim:

1. An electrical function generator comprising a signal source, a source of bias potential and a generating circuit, the circuit comprising:
   - a. a first two electrode unidirectionally conductive device,
   - b. a second two electrode unidirectionally conductive device,
   - c. linear impedance means connected from said signal source to a connecting point formed between dissimilar electrodes of said devices,
   - d. linear impedance means connected from said source of bias potential to said connecting point,
   - e. the free electrode of said first device being coupled to an output terminal of said circuit, and
   - f. the free electrode of said second device being connected to a reference potential in such a way that the said two devices are rendered conductive and nonconductive in substantially complementary fashion, and the effect of stray capacitance associated with said first device in its nonconductive state is reduced by the presence of said second device.

2. A generator according to claim 1 including a plurality of generating circuits, each connected to said signal source, and each connected to said source of bias potential in such a way that the said circuits become operative at different signal levels the output terminals of said circuits being connected together.

3. A generator according to claim 1 wherein said devices comprise semiconductor diodes.

4. A generator according to claim 1 including means tending to nullify the effect of bias current on the signal source.

5. A generator according to claim 1 in which the said common output terminal is coupled to a load.

6. A generator according to claim 5 in which the load comprises the input impedance of an amplifier.